United States Patent [19]

Weber

[11] 4,258,831

[45] Mar. 31, 1981

[54] BRAKE MECHANISM FOR A HAND OPERATED LIFT TRUCK

[75] Inventor: Donald D. Weber, Lexington, Ky.

[73] Assignee: Clark Equipment Company, Buchanan, Mich.

[21] Appl. No.: 32,986

[22] Filed: Apr. 25, 1979

[51] Int. Cl.³ .............................................. B60T 7/10
[52] U.S. Cl. ..................................... 188/119; 188/29
[58] Field of Search ............................. 188/117–119, 188/29, 105, 106 R

[56] References Cited

U.S. PATENT DOCUMENTS

| 967,824 | 8/1910 | Northrop | 188/119 |
| 1,428,735 | 9/1922 | Woehr | 188/119 UX |
| 3,516,521 | 6/1970 | Wolf | 188/119 |

FOREIGN PATENT DOCUMENTS 22135 of 1898 United Kingdom ..................... 188/119

Primary Examiner—Duane A. Reger
Attorney, Agent, or Firm—Marmaduke A. Hobbs

[57] ABSTRACT

A brake mechanism for hand operated lift trucks in which two brake shoes are pivotally mounted on the lower end of the handle assembly so that contact between one or the other shoe and the brake drum is accomplished by either upward or downward movement of the handle. The pivotal mounting of the shoes makes them self-adjusting. A spring is used to return the handle to a brake applied position when the handle is released by the operator.

13 Claims, 7 Drawing Figures

BRAKE MECHANISM FOR A HAND OPERATED LIFT TRUCK

Hand operated fork lift trucks are used extensively in warehouses and other storage facilities for moving goods stacked on pallets. In the typical design for such a vehicle, a pair of elevatable fork arms extend forward from the truck body in which are contained the lift mechanism and yoke, electric motor and battery for operation of the vehicle. A single dirigible wheel is mounted on the rear portion of the lift truck, and an operator's handle extends rearwardly from the truck. The operator's controls, such as an on-off switch, forward and reverse control and the like, are mounted on the handle. Roller-like wheels under the fork arms provide the forward stability of the vehicle. The operator walks behind the vehicle and steers it by lateral movement of the rearwardly extending handle, which controls the single rear wheel. Also, in the typical design for such a vehicle, the vertical positioning of the handle operates the braking mechanism of the truck. It is desirable in such vehicles to have the brake operate when the handle is either lifted upward or pushed downward toward the floor so that in the case of an emergency, movement in either direction will stop the truck. It is also desirable that when the handle is released, it will automatically assume a position wherein the brake is applied, so that the truck will automatically be braked to a stop if the operator slips and falls or otherwise loses control of the handle. This automatic braking feature also provides a parking brake, since the handle is always returned to a position wherein the brake is applied when the handle is released. Typically, braking occurs in only a slight range at the uppermost and lowermost positions, and the greatest range of movement of the handle is within the area where the vehicle may be driven, with no braking.

The present invention relates to an improvement in the braking systems of such lift trucks. Previous designs, such as that disclosed in U.S. Pat. No. 3,292,742 issued Dec. 20, 1966, have provided automatic braking upon release of the handle and braking upon either upward or downward movement of the handle; however, such systems have been exceedingly complex. In the past such systems have involved connections of camming devices, linkage systems and one or more springs, which take up considerable space and are frequently sources for system malfunction, since failure of one spring or linkage connection often renders the entire system inoperable. If the failure occurs during operation, danger can exist to the operator and nearby workers, and possible damage to the goods may result from the lack of an adequate back-up means of braking; hence, frequent maintenance is required to keep the mechanism properly adjusted for adequate braking. This periodic servicing is complicated by the large number of operating parts which must be removed or adjusted during servicing of the brake. Replacement of worn or damaged brake pads and shoes has likewise been difficult in the previous constructions. Due to the complexity of the previous designs, the springs which automatically return the handle to a braking posture and hold the brake in an applied position when the handle is released, have been smaller than desirable because of the limited space available in the various linkage connections, cams, springs and the like. Because of this, the braking force applied by the spring has not been as great as desired to stop the truck quickly in an emergency situation. The parking brake also is not as efficient because of the inadequate spring size and likewise has been a source of system failure. It is therefore one of the principal objects of the present invention to provide a brake mechanism for hand operated lift trucks which is simple in design and construction, and which thereby substantially eliminates the possibility of system failure by having substantially fewer parts, and which eliminates the necessity of linkage-type connections and therefore minimizes the possibility of equipment failure.

Another object of the present invention is to provide a brake mechanism for hand operated lift trucks which, due to its simplicity and design, can incorporate a large return spring so that greater braking force is exerted when the handle is in the released position, thereby providing more efficient automatic braking, and a stronger parking brake resistance, yet which can also be manually operated to apply the brake by moving the handle upward or downward in the event failure of the return spring does occur.

A further object of the present invention is to provide a simplified construction for a brake mechanism on hand operated lift trucks, which offers substantial savings in time and expense for maintenance as well as original construction, and which has brake shoes that are self-adjusting, thereby eliminating the need for periodic readjustment, and that are readily accessible so that the brake pads can be changed quickly and easily when excessive wear occurs.

A still further object of the present invention is to provide a brake mechanism for hand operated lift trucks which can be made to brake the truck automatically, effectively and quickly, in either the handle up or handle down position, yet which will still offer manual braking in the other position, each thereby at all times providing a back-up brake for the other, should either the automatic or manual operation fail.

Yet another object of the present invention is to provide a brake system for hand operated lift trucks in which the brake shoes operate independently of each other so that in the event that one shoe fails the other is still fully operational and will stop the vehicle when applied.

Further objects and advantages of the present invention will become apparent from the following detailed description of one embodiment, and the drawings, wherein.

Figure 1:
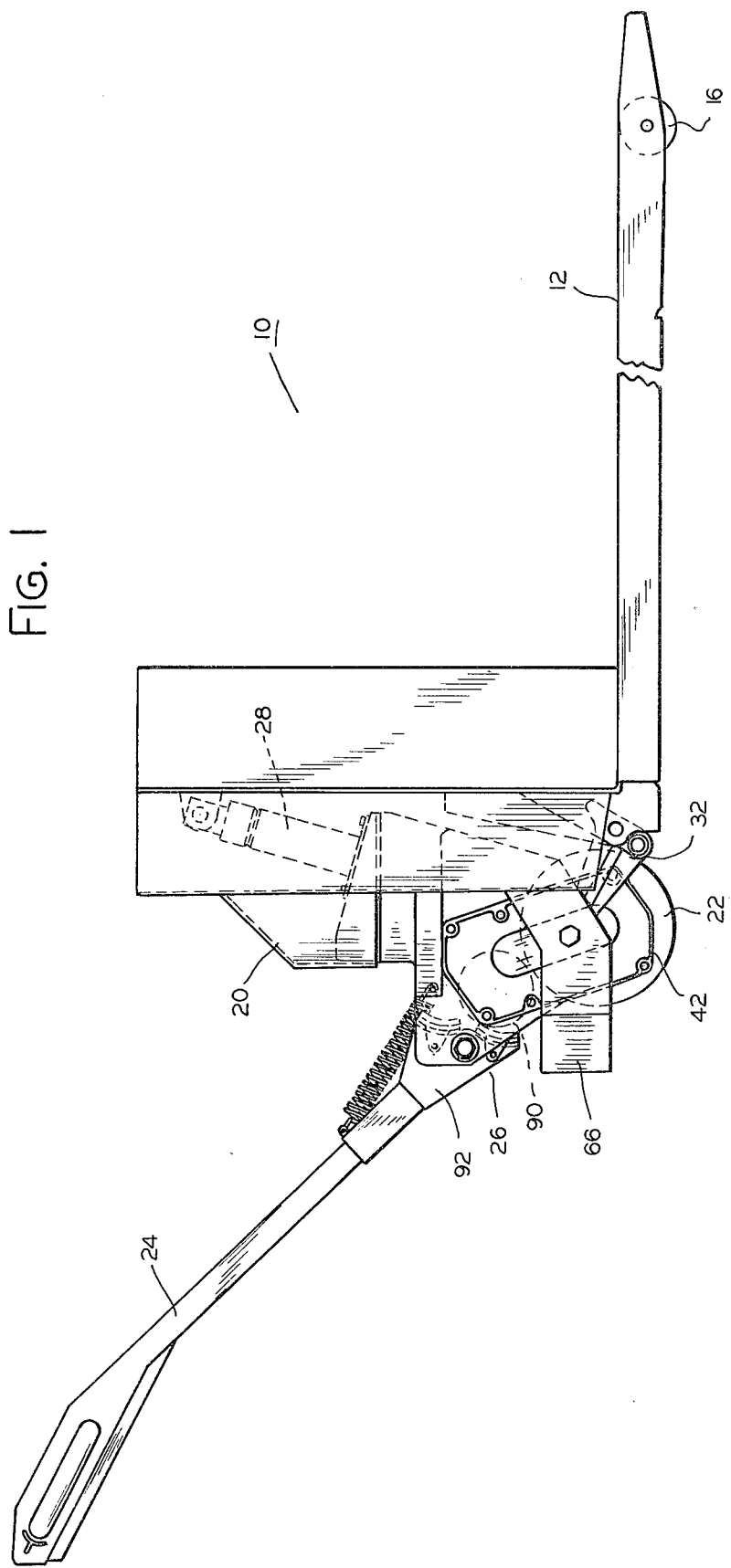
FIG. 1 is a side elevational view of a hand operated low lift truck in which the braking mechanism of the present invention, as well as other concealed parts, is shown by broken lines.
Figure 2:
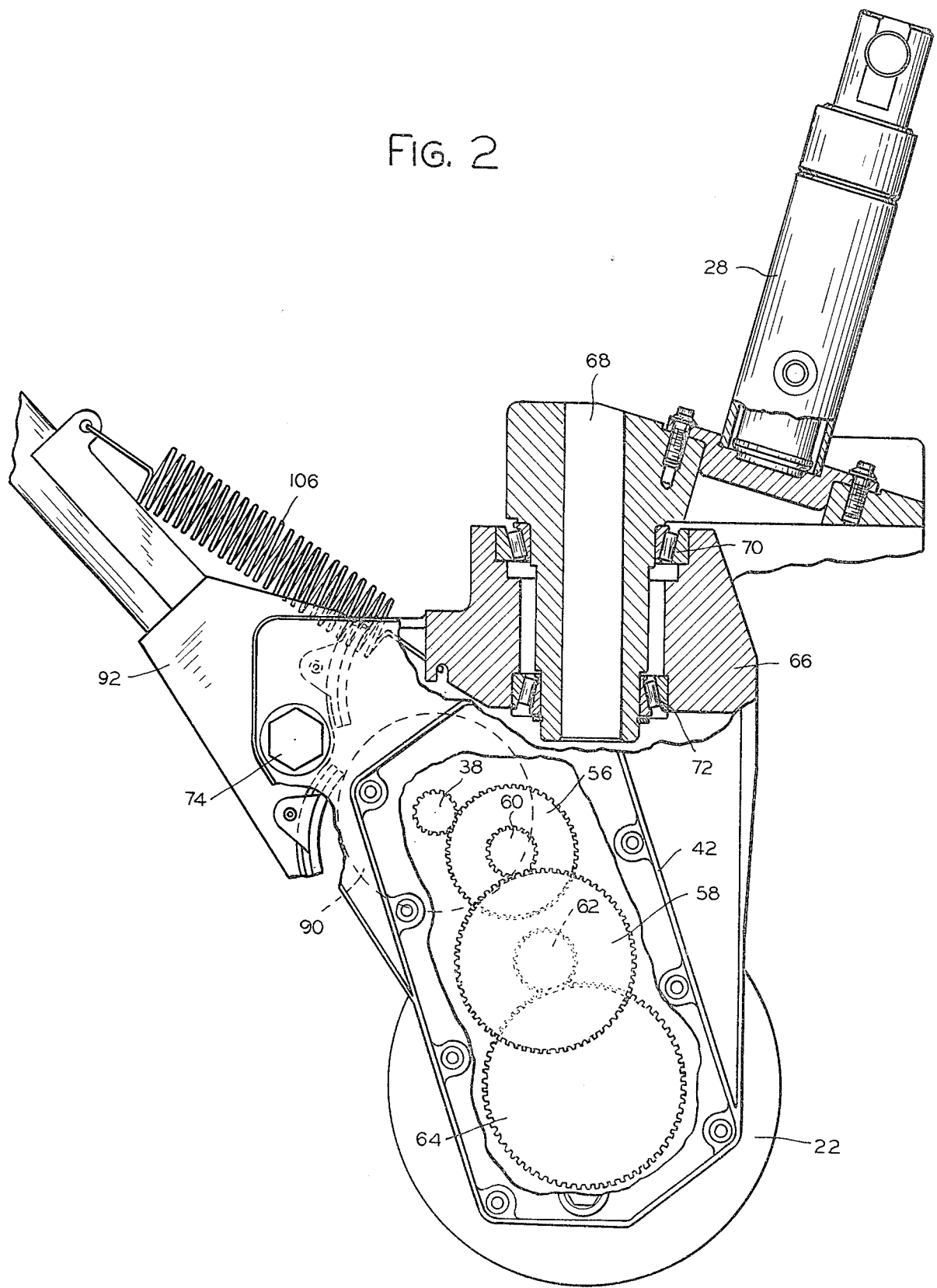
FIG. 2 is a side elevational and partial cross sectional view of a portion of the truck shown in FIG. 1, with some of the outer housing and covers removed, thereby revealing the gear train and other parts of the drive and braking mechanism.
Figure 3:
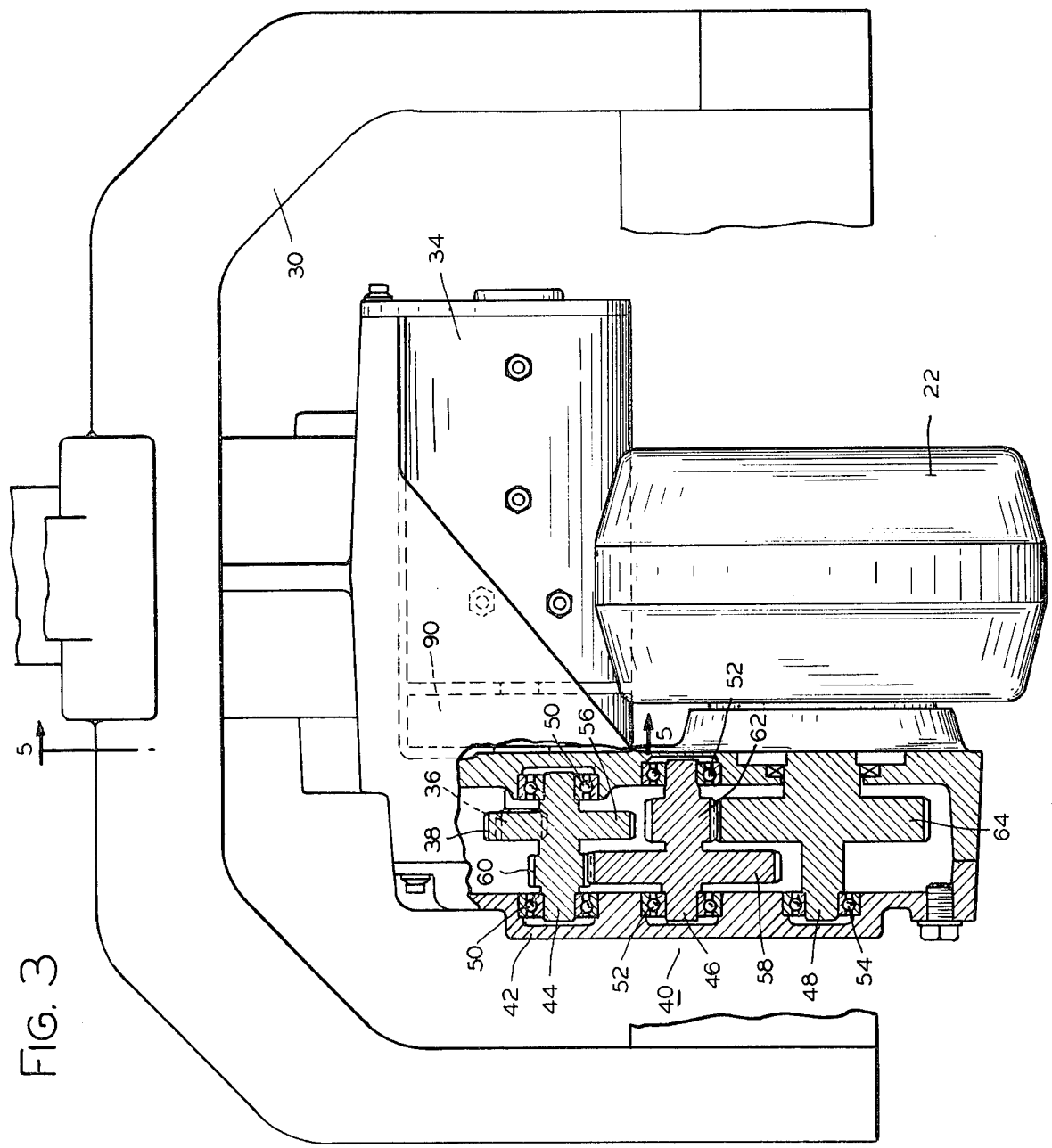
FIG. 3 is a rear elevational and partial cross sectional view, showing the relative positioning of the brake drum, drive motor and gear mechanism of the lift truck.
Figure 4:
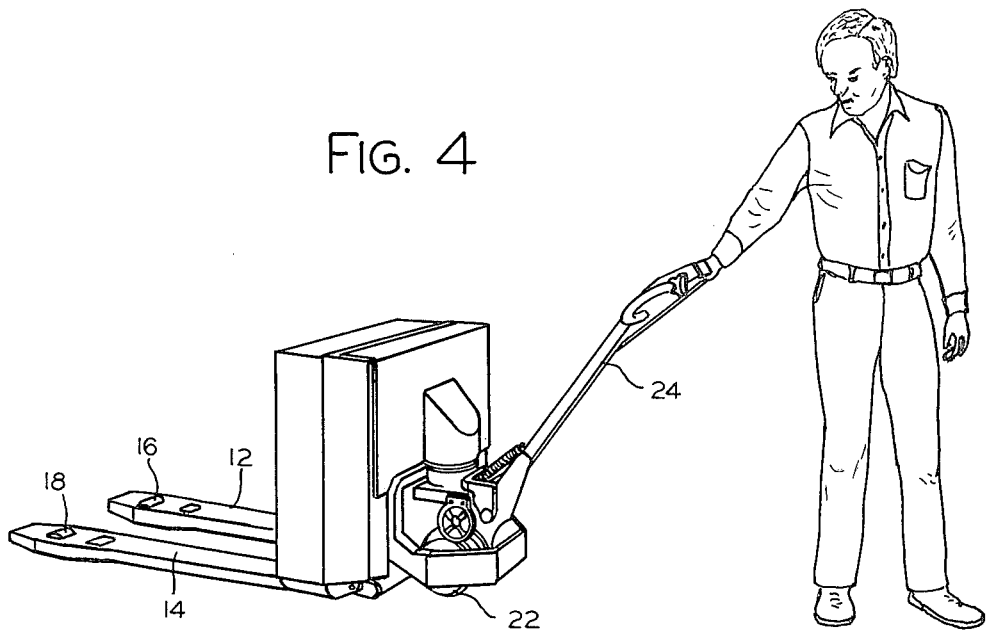
FIG. 4 is a perspective view of the low lift truck of FIG. 1, showing an operator holding the handle in a non-brake applied drive position.
Figure 5:
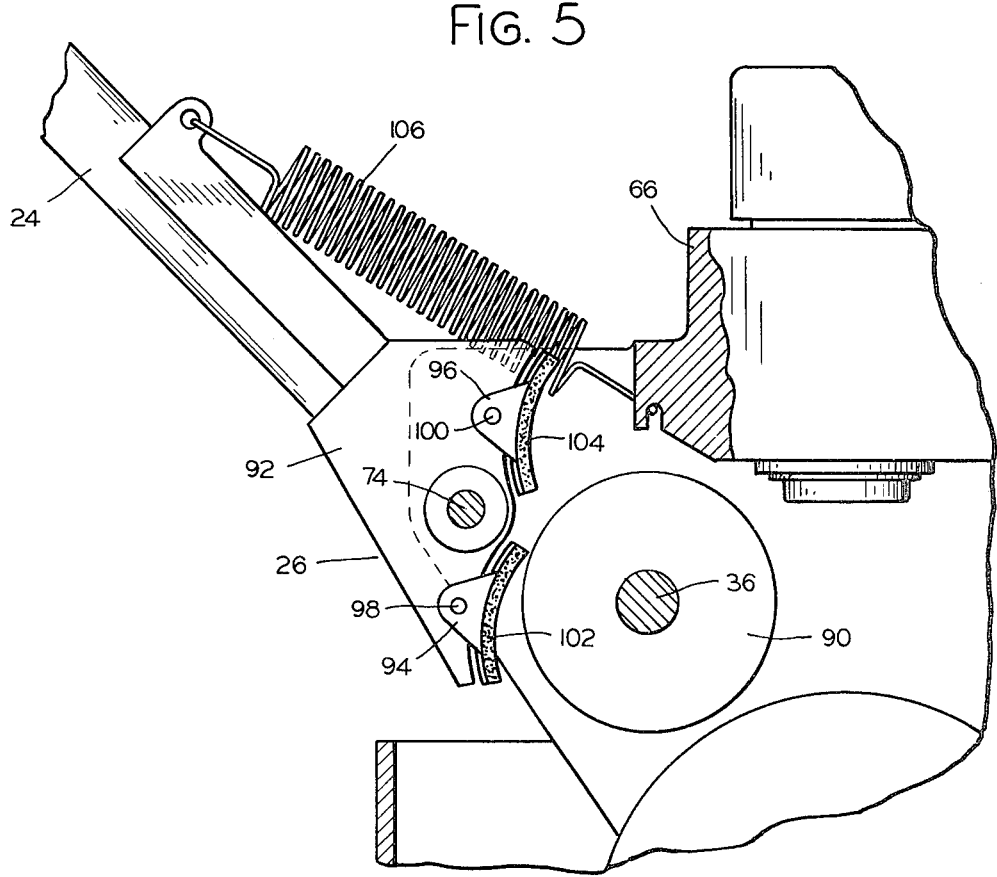
FIG. 5 is a fragmentary, vertical cross-sectional view, showing the braking mechanism of the lift truck with the handle in a drive position with neither brake applied, the cross section taken on line 5—5 of FIG. 3.

Referring more specifically to the drawings, and to FIG. 1 in particular, numeral 10 indicates a hand operated, self propelled, low lift truck which contains the brake mechanism of the present invention. Elevatable fork arms 12 and 14 extend forward and have load support wheels 16 and 18. The body housing 20 encloses the drive train and lift mechanism of the truck, and a single rear wheel 22 supports the back of the truck and is both the drive source and steering mechanism for operation of the truck. An operator's handle 24 extends rearwardly from the back of the truck, and a brake mechanism, indicated generally by numeral 26, is positioned at the lower end of the operator's handle. The lifting mechanism consists essentially of a cylinder 28 connected to a yoke 30. Activation of cylinder 28 raises yoke 30, and through a linkage connection 32, elevates the rear portion of lift arms 12 and 14, thereby raising the arms and the load from the floor, leaving the front portion of the truck supported only by support wheels 16 and 18. An electric drive motor 34 has a horizontal drive shaft 36 and a drive gear 38 which, through the connection of gear reduction train 40, drives rear wheel 22, thereby propelling the vehicle. The gear reduction train 40 is enclosed in an outer housing 42 and consists of a three reduction gear system having three shafts 44, 46 and 48 journaled respectively in bearings 50, 52 and 54 at each end of the respective shafts. Shafts 44 and 46 have driven or input gears 56 and 58 and output gears 60 and 62, respectively. Motor 34 drives drive gear 38 which drives input gear 56 on shaft 44, gear 60 drives gear 58 on shaft 46, and gear 62 drives gear 64 on shaft 48 which in turn drives dirigible wheel 22. The drive train, motor, rear wheel assembly and other related parts are mounted within drive unit housing 66, which is connected to the forward portion of the lift truck by pivot shaft 68 journaled in bearings 70 and 72 within housing 66. The operator's handle 24 is also connected to housing 66 by bolt 74, and it can be seen that lateral movement of the operator's handle will rotate the housing about pivot shaft 68, thus angularly turning wheel 22, thereby steering the vehicle. The lift mechanism, drive train and steering assembly thus far described may be considered conventional or standard operating parts and will not be described in further detail.

The brake mechanism 26 consists of a brake drum 90 mounted on shaft 36 for rotation directly therewith between motor 34 and drive gear 38. A casting 92 is rigidly mounted on the lower portion of operator's handle 24 and supports brake shoes 94 and 96, which are pivotally mounted on casting 92 by pins 98 and 100, respectively, thereby allowing some movement of brake shoes 94 and 96 to permit flush contact during braking along the entire length of the brake shoes even as wear occurs, thus rendering the brake shoes self adjusting. Brake pads or linings 102 and 104 provide the contact surface between the brake shoe and brake drum. The brake shoes are so positioned that movement of operator's handle 24 downwardly will move brake shoe 94, and thereby brake pad 102, into contact with brake drum 90, and movement of operator's handle 24 upwardly will move brake shoe 96, and thereby brake pad 104, into contact with the brake drum. Hence, braking can be accomplished by either upward or downward movement of the operator's handle. A coil return spring 106 is attached between drive unit housing 66 and operator's handle 24, and will automatically return the operator's handle to a position in which upper brake pad 104 is in contact with the brake drum if the operator intentionally or accidentally releases handle 24, this position most clearly being seen in FIG. 7. Also, in the standing position when the vehicle is not being used, the upper brake pad will be held in contact with the brake drum by return spring 106, thereby providing a parking brake for the vehicle. Since return spring 106 is positioned in an essentially open area, a large heavy-duty spring can be used. Use of the large spring will hold brake pad 104 more firmly against brake drum 90, thereby both stopping the vehicle more quickly and providing a more resistant and effective parking brake. In either of the upper or lower brake applied positions, the operator can achieve rapid braking of the vehicle by exerting greater force on handle 24 either upward or downward. Return spring 106 does not hinder the manual application of the brake in the lower position, since the length of handle 24 above the attachment point of the spring provides sufficient torque and leverage that by pushing downward the operator can easily over-ride the retractive force of the return spring.

Figure 7:
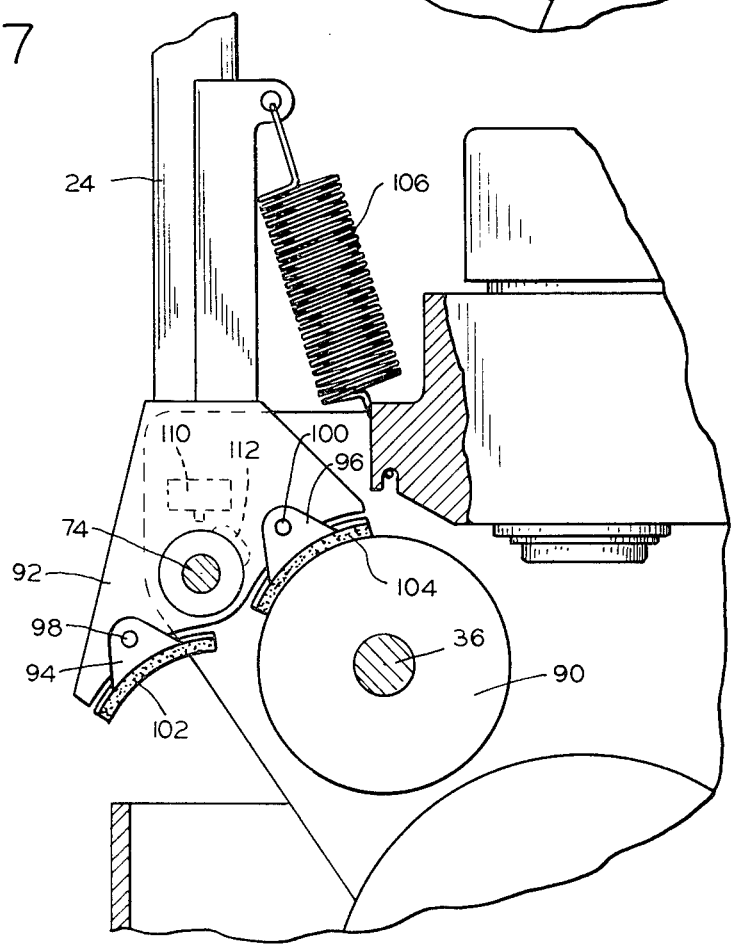
FIG. 7 is a vertical cross sectional view similar to that shown in FIGS. 5 and 6 but with the handle in the automatically returned upper brake applied position.

In the typical construction, a current interrupter switch 110, shown schematically by broken lines in FIG. 7, is disposed near handle 24 and is operated by a cam 112 on the handle. This switch, which is common in previous designs, interrupts the electrical current to the motor 34, driving wheel 22 when the handle is moved toward either of the brake applied positions. Thus, the motor is shut off and the vehicle is free wheeling when the brake is applied and the motor likewise will not start until the brake shoes have been moved away from the brake drum. With this interrupter switch, the brake mechanism and motor never operate against each other.

Figure 6:
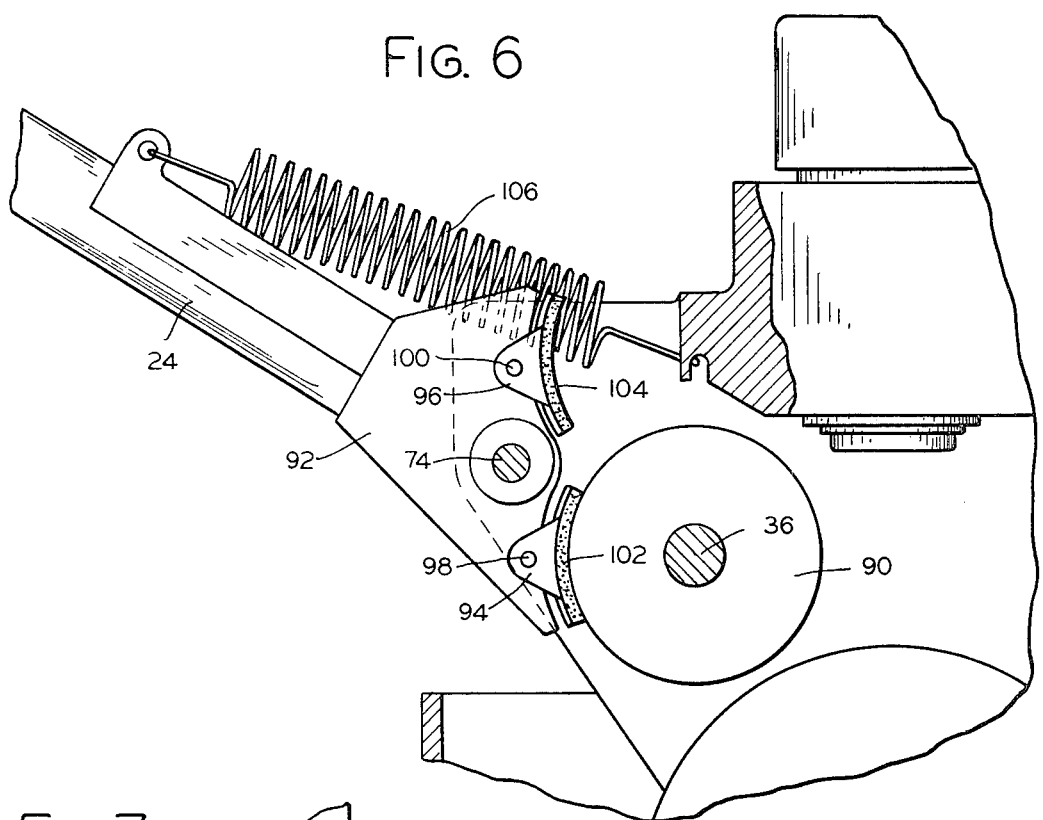
FIG. 6 is a vertical cross sectional view similar to that of FIG. 5 but showing the handle in the downward brake applied position.

In the use and operation of a vehicle employing the braking mechanism of the present invention, the operator will drive the vehicle to a loaded pallet and position the fork arms 12 and 14 under the pallet. Activation of the cylinder 28, acting through yoke 30 and linkage connections 32, lifts the load off the floor. At this point the vehicle and load are supported only by load wheels 16 and 18 and rear wheel 22. The lift truck and load may then be driven to the desired place. When the operator wishes to stop the vehicle, he may do so by either upward or downward movement of handle 24. When handle 24 is moved downward, the interrupter switch shuts off motor 34 and brake shoe 94 is moved closer to brake drum 90 until brake pad 102 contacts the brake drum. Increased force exerted on handle 24 will provide increased resistance between brake pad 102 and brake drum 90, thereby providing greater braking force. Hence, if the vehicle must be stopped quickly, the operator may do so by pushing forcefully downwardly on handle 24. The general positioning of the brake mechanism when the lower brake is applied is shown in FIG. 6. When the operator's handle 24 is moved upward, through the operating range in which the vehicle is driven, the upper brake shoe 96 is moved closer to brake drum 90 and brake pad 104 will contact the brake drum, thereby stopping the vehicle. The interrupter switch will have again shut off motor 34 just prior to initiation of braking action. The return spring 106 aids in the upward movement of the handle and will return the handle to a brake applied position automatically if the handle is released by the operator, either intentionally or accidentally. This is an added safety feature of this braking mechanism, namely that if the operator should slip, fall or otherwise lose control of the truck, the return spring 106 will automatically brake the vehicle, thereby reducing the possibility of injury to the operator or other persons, or damage to the goods either on or in proximity to the truck. Due to the simplicity in the design of the present brake mechanism, there is ample room for a heavy duty return spring 106 which will provide effective braking force in the upper brake applied position and an efficient parking brake; however, neither the upper nor lower brake applied position is totally dependent upon a spring for application. The operator, by applying force to the handle, can increase the effectiveness of the brake when applied in either direction. In the operation through the full range of movement of handle 24, starting from the parked position as shown in FIG. 7, in which spring 106 holds the upper brake shoe 96 against brake drum 90, slight downward movement of handle 24 from the vertical releases brake pad 104, freeing the vehicle for movement. Normally at about five degrees from the vertical, the interrupter switch is activated, permitting current to flow to motor 34 for operation of the vehicle. On further downward movement of handle 24, it passes through the work range in which the motor is in operation. At a handle position of approximately 38° above the horizontal, the interrupter switch is opened, shutting off current to the motor and making the vehicle free-wheeling. Continuing downward movement of the handle of about five degrees moves lower brake shoe 94 into the position where brake pad 102 contacts brake drum 90, thus stopping the vehicle. Upward movement of handle 24 reverses the foregoing operation. Throughout the principal portion of the range of movement of handle 24, the vehicle is in its drive or work stage.

Since brake shoes 94 and 96 are mounted on casting 92 by pins 98 and 100, the brake shoes are not rigid in relation to the casting 92 but will pivot on their respective mounting pins, permitting the brake shoes to be self adjusting. Thus, as wear occurs on the brake pads 102 and 104, full face-to-face contact will be maintained between the brake pad and the brake drum as the brake shoes pivot on their respective mounting pins, thereby compensating for the wear of the pads. This self adjusting feature saves substantial time in periodic maintenance, in that adjustment of the brake shoes is not required. When excessive wear occurs and the brake pad must be replaced, the brake shoes are easily removed by simply removing pins 98 and 100, and access to the brake shoes is facilitated by the simplicity in design.

Important backup or safety features are inherent in the design of the present invention, including the elimination of the complex linkage, cam and spring operating means of the previous designs, and with their elimination, substantially all of the sources of brake system failure have been eliminated. For example, in the present design, if coil spring 106 breaks, either upward or downward movement of the handle will still brake the vehicle. If either of the brake shoes 94 or 96 were to fail or break, a backup would still be provided, in that movement in the opposite direction from the disabled brake shoe would still brake the vehicle. Instances of total failure of the system have virtually been eliminated.

With minor modifications, the braking system can be arranged such that the automatic return spring is positioned below operator's handle 24. Hence, if desired, the system can be designed so that the handle is automatically returned to a brake applied position in which the brake handle is down rather than up. This and other changes and modifications of the brake mechanism described in detail herein may be made without departing from the scope of the present invention.

I claim:

1. A brake mechanism for a hand operated lift truck having a frame, a drive motor, drive shaft, and an operator's handle extending rearwardly from the truck and pivotally attached thereto for movement from a substantially vertical to a substantially horizontal position: said brake mechanism comprising a brake drum mounted on the drive shaft for rotation therewith, first and second brake shoes having brake pads thereon, support means for connecting said shoes to said handle for movement therewith so that said first brake shoe engages said brake drum when said handle is moved upward and said second brake shoe engages said brake drum when said handle is moved downward, and a return spring connected between the operator's handle and the truck frame for holding the operator's handle when it is released in a position in which one of said brake shoes is engaged with said brake drum.

2. A brake mechanism as defined in claim 1 in which a pivot means is used to connect each of said brake shoes on said support means so that each of said brake shoes will adjust to proper position for full contact with said brake drum.

3. A brake mechanism as defined in claim 1 in which said brake drum is disc shaped, with the shoe engaging surface on the periphery thereof, and the brake shoes are supported by said means on said operator's handle radially outwardly from the periphery of said brake drum.

4. A brake mechanism as defined in claim 2 in which said brake drum is disc shaped, with the shoe engaging surface on the periphery thereof, and the brake shoes are supported by said means on said operator's handle radially outwardly from the periphery of said brake drum.

5. A brake mechanism as defined in claim 4 in which said first brake shoe is disposed above said second brake shoe, and said brake shoes are mounted for separate pivotal movement on said support means.

6. A brake mechanism as defined in claim 1 in which a pivot means disposed radially outwardly from the brake drum connects said operator's handle to said frame, and a pivot means connects said first brake shoe to said support means above the pivot means for said handle, and a pivot means connects said second brake shoe to said support means below the pivot means for said handle.

7. A brake mechanism as defined in claim 4 in which a pivot means disposed radially outwardly from the brake drum connects said operator's handle to said frame, and a pivot means connects said first brake shoe to said support means above the pivot means for said handle, and a pivot means connects said second brake shoe to said support means below the pivot means for said handle.

8. A brake mechanism as defined in claim 1 in which said return spring is connected to said operator's handle and said frame above the pivot point of the handle.

9. A brake mechanism as defined in claim 7 in which said return spring is connected to said operator's handle and said frame above the pivot point of the handle.

10. A brake mechanism as defined in claim 1 in which said return spring moves said operator's handle upwardly and holds said first brake shoe against said brake drum when the operator's handle is released.

11. A brake mechanism as defined in claim 9 in which said return spring moves said operator's handle upwardly and holds said first brake shoe against said brake drum when the operator's handle is released.

12. A brake mechanism as defined in claim 1 in which a current interrupter switch is disposed adjacent the handle, and a cam movable with the handle contacts and operates said switch during angular movement of the handle to shut off the motor when either of said brake shoes is engaged with said brake drum.

13. A brake mechanism as defined in claim 9 in which a current interrupter switch is disposed adjacent the handle, and a cam movable with the handle contacts and operates said switch during angular movement of the handle to shut off the motor when either of said brake shoes is engaged with said brake drum.

* * * * *